(12) United States Patent
Gardner, Jr. et al.

(10) Patent No.: US 6,210,614 B1
(45) Date of Patent: Apr. 3, 2001

(54) PROCESS OF MAKING DECORATIVE AUTOMOTIVE INTERIOR TRIM ARTICLES WITH CAST INTEGRAL LIGHT-STABLE COVERING CONTAINING INVISIBLE TEAR SEAM

(75) Inventors: John A. Gardner, Jr., Deerfield, NH (US); Phillip S. Wilson, Commerce Township, MI (US)

(73) Assignee: Atoma International Inc., Markham (CA)

( * ) Notice: Subject to any disclaimer, the term of this patent is extended or adjusted under 35 U.S.C. 154(b) by 0 days.

(21) Appl. No.: 09/093,613

(22) Filed: Jun. 9, 1998

Related U.S. Application Data

(60) Provisional application No. 60/049,771, filed on Jun. 16, 1997.

(51) Int. Cl.⁷ .......................... B29C 41/04; B29C 41/18; B29C 44/06

(52) U.S. Cl. .................. 264/46.5; 264/255; 264/302; 264/310; 264/338

(58) Field of Search .................................... 264/338, 310, 264/255, 302, 46.5

(56) References Cited

U.S. PATENT DOCUMENTS

| T100,701 | 6/1981 | Kuehn . | |
|---|---|---|---|
| 1,889,905 | 12/1932 | Saeger . | |
| 3,123,403 | * 3/1964 | Hood | 264/45.7 |
| 4,195,148 | 3/1980 | Hagen . | |
| 4,217,325 | 8/1980 | Colby . | |
| 4,246,213 | * 1/1981 | Takamatsu et al. | 264/46.7 |
| 4,285,897 | 8/1981 | Zakaria et al. . | |
| 4,294,880 | 10/1981 | Nishida . | |

(List continued on next page.)

FOREIGN PATENT DOCUMENTS

| 0379246 | 7/1990 | (EP) . |
|---|---|---|
| 0 392 285 | 10/1990 | (EP) . |
| 0 425 240 | 5/1991 | (EP) . |

(List continued on next page.)

OTHER PUBLICATIONS

Patent Abstracts of Japan, Vol. 96, Mar. 1996 re JP–08–07117.
"Elastrogran France: Nouveau Procéde Pour Les Panneaus De Portes", *Ingenieurs De L'Automobile*, No. 676, Oct. 1, 1992, p. 63
Patent Abstracts of Japan, vol. 13, No. 500 (Nov. 10, 1989) and JP01202550.

*Primary Examiner*—Allan R. Kuhns
(74) *Attorney, Agent, or Firm*—Pillsbury Winthrop LLP

(57) ABSTRACT

An article including a panel-like structure mountable in an automobile vehicle to form a part of the interior thereof and conceal a secondary restraint system, and a process for making the same are disclosed. According to this process, an outer layer is established on a first mold surface, with the exterior surface of the outer layer having an opaque visual appearance and a configuration complementary to the first mold surface. A casting composition is then rotationally casted onto an inner surface of the outer layer to create an inner layer of a predetermined thickness while restricting the gel thickness along an elongated structurally weakened tear seam. The casting composition is then fused. The outer layer and inner layer collectively define a layered composite structure, with the outer layer presenting the same opaque visual appearance to the exterior surface thereof unaffected by change in the inner layer thickness so that the structurally weakened tear seam is hidden from view. The composite structure is united with a reinforcing substrate including at least one door so that the structurally weakened tear seam is in cooperative association with the door so as to fracture when the door is actuated.

36 Claims, 8 Drawing Sheets

U.S. PATENT DOCUMENTS

| | | |
|---|---|---|
| 4,312,672 | 1/1982 | Blahak et al. . |
| 4,350,777 | 9/1982 | Henrichs et al. . |
| 4,520,042 | 5/1985 | Smith . |
| 4,562,025 | 12/1985 | Gray . |
| 4,592,887 | 6/1986 | Bando et al. . |
| 4,621,995 | 11/1986 | Wersosky . |
| 4,623,503 | 11/1986 | Anestis et al. . |
| 4,668,460 | 5/1987 | Ongena . |
| 4,755,333 | 7/1988 | Gray . |
| 4,822,549 | 4/1989 | Verwilst et al. . |
| 4,825,974 | 5/1989 | Hoffmann et al. . |
| 4,923,657 | 5/1990 | Gembinski et al. . |
| 4,925,151 | 5/1990 | Gray . |
| 4,952,351 * | 8/1990 | Parker et al. ............ 264/46.4 |
| 5,051,310 | 9/1991 | Horn et al . |
| 5,071,683 | 12/1991 | Verwilst et al. . |
| 5,082,609 | 1/1992 | Rohrlach et al. . |
| 5,084,122 | 1/1992 | Fukushima et al. ............ 156/252 |
| 5,115,048 | 5/1992 | Maeda et al. . |
| 5,130,402 | 7/1992 | Akiyama et al. . |
| 5,154,871 | 10/1992 | Wagner et al. . |
| 5,207,961 | 5/1993 | Wank et al. . |
| 5,223,193 | 6/1993 | Bianchin et al. . |
| 5,234,246 * | 8/1993 | Henigue et al. ............ 296/70 |
| 5,234,653 | 8/1993 | Buzzoni et al. . |
| 5,242,738 | 9/1993 | Furuya et al. . |
| 5,256,354 * | 10/1993 | Chadwick ............ 264/119 |
| 5,284,918 | 2/1994 | Huynh-Tran et al. . |
| 5,288,103 | 2/1994 | Parker et al. ............ 280/728 R |
| 5,316,715 | 5/1994 | Gray . |
| 5,316,822 * | 5/1994 | Nishijima et al. ............ 428/138 |
| 5,338,788 | 8/1994 | Miyataka et al. . |
| 5,344,183 | 9/1994 | Hersman et al. ............ 280/728 B |
| 5,354,532 | 10/1994 | Nakai et al. . |
| 5,387,390 | 2/1995 | Kornylo . |
| 5,387,750 | 2/1995 | Chiang . |
| 5,397,409 | 3/1995 | Kornylo . |
| 5,466,412 * | 11/1995 | Parker et al. ............ 264/310 |
| 5,484,273 | 1/1996 | Parker et al. . |
| 5,484,561 * | 1/1996 | Weber et al. ............ 264/46.4 |
| 5,523,337 | 6/1996 | Banerjee et al. . |
| 5,580,501 | 12/1996 | Gallagher et al. . |
| 5,656,677 | 8/1997 | Jourquin et al. . |
| 5,662,996 | 9/1997 | Jourquin et al. . |
| 5,885,662 | 3/1999 | Gardner, Jr. ............ 427/426 |
| 6,013,210 * | 1/2000 | Gardner, Jr. ............ 264/40.1 |
| 6,017,617 * | 1/2000 | Gardner, Jr. ............ 428/309.9 |

FOREIGN PATENT DOCUMENTS

| | | |
|---|---|---|
| 39 38 082 | 5/1991 | (EP) . |
| 0 744 264 | 11/1996 | (EP) . |
| 0767089 A2 | 4/1997 | (EP) . |
| 2702989 | 9/1994 | (FR) . |
| 2079667 | 1/1982 | (GB) . |
| 2 277 475 | 11/1994 | (GB) . |
| 2 281 529 | 3/1995 | (GB) . |
| 60-34810 | 2/1985 | (JP) . |
| 7-164457 | 6/1995 | (JP) . |
| 383608 | 3/1973 | (SU) . |
| 880087 | 2/1988 | (WO) . |
| 93/23237 | 11/1993 | (WO) . |
| WO 94/12331 | 6/1994 | (WO) . |
| 9510633 | 4/1995 | (WO) . |
| 9532850 | 12/1995 | (WO) . |

* cited by examiner

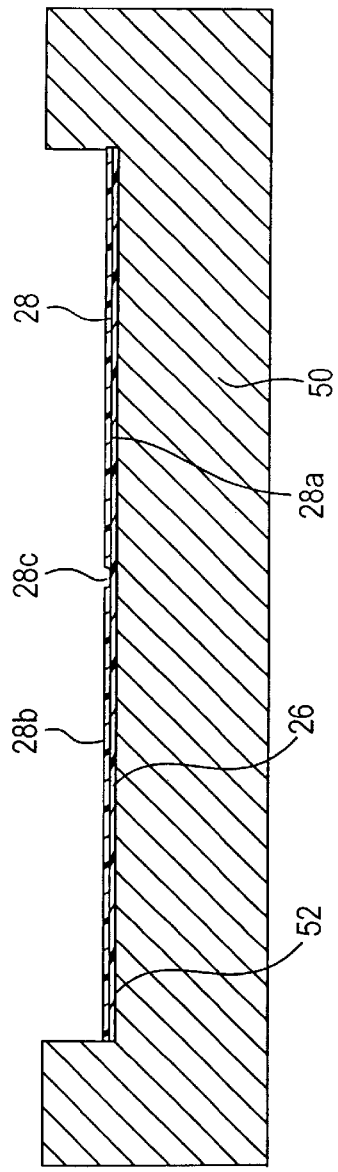
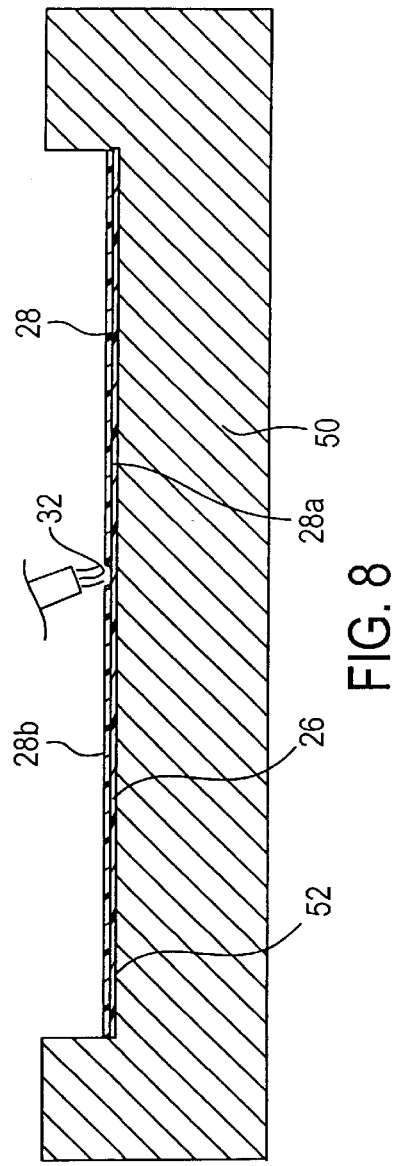
FIG. 7
FIG. 8

PROCESS OF MAKING DECORATIVE AUTOMOTIVE INTERIOR TRIM ARTICLES WITH CAST INTEGRAL LIGHT-STABLE COVERING CONTAINING INVISIBLE TEAR SEAM

Priority is claimed on Provisional Patent Application No. 60/049,771, filed Jun. 16, 1997, the complete disclosure of which is incorporated herein by reference. The complete disclosures of regular patent application Ser. No. 09/061,915, entitled "Decorative Automotive Interior Trim Articles with Cast Integral Light Stable Covering and Process for Making the Same", is also incorporated herein by reference.

BACKGROUND OF THE INVENTION

1. Field of Invention

The present invention relates to automotive interior trim articles containing a panel-like structure mountable in an automobile vehicle to form a part of the interior thereof, and in particular to automobile interior trim articles, such as instrument panels and door panels, which conceal a secondary restraint system including an air bag. The present invention further relates to a process for making the aforementioned automotive interior trim articles.

2. Description of Related Art

The escalation of the commercial significance of air bag restraint systems in automobiles as secondary restraint systems has manifested itself in the appearance of air bag restraint systems in many, if not most, new automobiles. The commercial impact of such secondary systems is attributable both to government regulations and consumer demand for safety.

Generally, air bag restraint systems are concealed from view during normal operation of the vehicle by arranging the air bag restraint systems behind automotive interior trim articles, such as instrument panels and/or door panels.

In order to permit the deployment of the air bags upon collision of the vehicle, interior trim articles are often formed with a multi-layered structure comprising a rigid substrate having hidden doors formed therein, an outer decorative skin layer, and a soft cellular polyurethane foam layer formed therebetween. The hidden doors of the rigid substrate are configured and arranged in such a manner that the edges of the doors define discernible patterns, such as patterns in the form of H, C, U, and X shapes.

During deployment of the air bag, the air bag is actuated via a gas generating system and expands from a folded inoperative state to a fully inflated state. The expansion of the gas inflates the air bag against the backside of the hidden doors and forces the hidden doors to open into the passengers' compartment of the vehicle. The emergence of the hidden doors into the passengers' compartment creates a passageway which permits deployment of the air bag into the passengers' compartment of the vehicle and thereby protects the passengers from violent collision against the panel-like structure.

In order to minimize obstruction of the passageway through which the expanding air bag traverses, the underside of the outer skin of the multi-layered structure can be provided with structurally weakened tear seams. These tear seams often take the form of perforated or channel-like patterns, and are constructed and arranged to substantially correspond to and overlay the pattern (e.g., H-shaped) defined by the hidden doors of the rigid substrate. During deployment of the air bag, the outer skin tears or fractures along the structurally weakened tear seams. Absent the presence of such structurally weakened tear seams in the outer skin, the outer skin may possess sufficient internal strength to refrain from fracture upon deployment of the rapidly expanding air bag. If the skin does not fracture, the entire outer skin can become separated from the rigid substrate and/or the multi-layered structure can be dismounted from the vehicle frame, thereby imperiling the safety of the passengers.

Different techniques have been proposed to form a multi-layered structure having an outer skin with a structurally weakened, rupturable tear seam. One conventional technique involves the preparation of a rotational-cast poly(vinyl chloride) ("PVC") skin by providing a powder box including a seam-defining structure or gasket, which partitions the powder box into two chambers. A PVC powder with appropriate colorants and additives, such as plasticizers, is retained in each of the chambers. Where a dual-tone appearance is desired, the chambers can be supplied with PVC powders containing different colorants, in which case the seam-defining structure simultaneously serves as a color division rim. The powder box is then engaged to a metal mold component to define a closed casting system having the seam-defining structure closely spaced from a heated mold surface of the metal mold component. The PVC powder is then tumbled against a heated molding surface of the metal mold by a rotational casting method until the PVC powder is formed against a moderately heated mold surface in a gelled state. Excess powder collects in the powder box, and is thereafter separated and removed from the mold. Since the seam-defining structure obstructs the gelling of PVC powder on the portion of the heated mold surface therebelow, the structurally weakened portion of the skin is formed below the seam-defining structure. A lower density or lower strength tear seam material (also referred to as a filler material) is then sprayed into the perforated or channel-like seams and gelled. The gelled PVC material and the gelled tear seam material are then fused by heating the materials to their fusion temperatures, and thereafter cooled to provide the PVC-based covering in a thermoplastic solid state. The skin can then be united with the rigid substrate, such that the low density material of the outer skin is positioned to substantially correspond to and overlay the edges of the hidden doors.

There are at least two problems associated with the above-described conventional method.

First, the presence of the seam-defining structure hinders the normal compacting of the PVC powder which occurs during rotation of the closed system. Hence, the portion of the skin layer corresponding to the structurally weakened tear seam possesses a greater porosity than the remainder of the skin. The difference in porosity between the structurally weakened portion and the remaining portion of the outer skin makes the pattern of the tear seam visible, especially in bright light.

The second problem is due to the difference in composition of the cast skin and, the sprayed tear seam material. In top-mount applications in which the tear seam is exposed to high temperatures and intense UV radiation, the sprayed material introduced into the tear seam ages differently than the surrounding cast material and will become clearly visible over time.

For these reasons, multi-layered structures made by the aforementioned conventional method are only employed in mid mount applications where the hidden tear seam is not exposed to direct sunlight.

In order to overcome these problems, it has been proposed to form a PVC skin layer of uniform thickness, and thereafter form the structurally-weakened tear seams by laser cutting the backside of the skin. Due to the relatively small thickness of the skin, however, it is very difficult to precisely control the depth of the cut portion. Consequently, errors in laser cutting can lead to the disposal of skins as unusable scrap. In addition, the capital investment associated with obtaining and operating a laser cutting apparatus is very high.

A need therefore exists to provide a process for making a panel-like structure containing a decorative covering having an inner surface with a structurally weakened tear seam in which the tear seam is concealed from view, even after employing the covering in top mount applications which subject the covering to prolonged use and exposure to high temperatures and intense UV radiation.

SUMMARY OF THE INVENTION

It is, therefore, an object of the present invention to solve the aforementioned problems associated with the related art as well as to address the need expressed above. In accordance with the principles of the present invention, this and other objects are attained by providing a process for making a panel-like structure mountable to an automobile vehicle to form a part of the interior thereof.

The panel-like structure includes a layered composite structure united to a reinforcing (or rigid) substrate having at least one movable door, the substrate being hidden from the vehicle interior when the panel-like structure is mounted in a vehicle. The layered composite structure comprises an outer layer defining at least a portion of an at least partially exposed exterior surface of the panel-like structure and an inner layer having an outer surface interfacially chemically bonded to the adjacent inner surface of the outer layer. The inner surface of the inner layer has a structurally weakened tear seam defined therein, which can be filled with a material having a lower tensile strength than the remainder of the inner layer of the composite structure. Upon actuation of a concealed secondary restraint system, the door opens into the passengers' compartment of the vehicle and fractures the composite structure along at least a portion of the structurally weakened tear seam to create a passageway which permits an air bag of the secondary restraint system to deploy into a passengers' compartment of the vehicle.

According to one embodiment of this process, at least the following steps are performed to prepare the panel-like structure. First, a first composition comprising at least one base polymer and at least one desired coloring agent is applied onto a heated mold surface having a complementary configuration to the outer layer. The first composition is then substantially dried while on the mold surface to form the exposed outer layer. After the outer layer has been formed, a seam-defining structure or gasket is placed in direct contact with or in spaced relation to the inner surface of the outer layer. A casting composition comprising a base resin material and appropriate additives is then rotationally cast against the inner surface of the outer layer while on the mold surface to form the inner layer, whereby the seam-defining structure forms the structurally weakened tear seam on the inner surface of the inner layer. The structurally weakened tear seam may then optionally be filled with a filler material that is miscible in the base resin, but which, after casting and cooling, has a lower tensile strength than the casted composition. The cast composition and filler material are then fused to form the layered composite structure. Next, the layered composite structure is united with the reinforcing substrate so that the reinforcing substrate serves to reinforce the outer layer. Optionally, a soft cellular polyurethane foam layer can be formed intermediate to the inner layer and to the reinforcing substrate. In addition, the structurally weakened portion of the inner layer is positioned to generally correspond to and overlay at least the parting edges of the hidden doors (e.g., where the hidden doors part from each other and/or part from the reinforcing substrate), such that the composite structure is fractured along at least a portion of the structurally weakened portion during inflation of the air bag of the concealed secondary restraint system. Consequently, the panel-like structure is in cooperative association with the secondary restraint system to permit deployment of the air bag upon collision of the vehicle, yet retains the touch and color of the exposed portion and the compressing feel provided to the outer layer by the inner layer and the optional soft cellular foam intermediate layer.

Preferably, the first composition is a water-dispersed composition comprising at least one light-stable aliphatic thermoplastic polyurethane containing one or more pendent hydroxyl and/or carboxyl functional groups as the base polymer, the desired coloring agent, and at least one heat-activated reactive crosslinking monomer, with the heat-activated reactive crosslinking monomer preferably being carbodiimide. In accordance with this preferred embodiment, the light-stable thermoplastic polyurethane and the heat-activated reactive crosslinking monomer are heated, for example, by pre-heating the mold surface, and reacted to crosslink the thermoplastic polyurethane via the reactive crosslinking monomer. Still further, the fusing step preferably involves crosslinking at least one of the base resin and the additives of the casting composition with the polyurethane of the outer layer via unreacted functional groups of the heat-activated reactive crosslinking monomer in the outer layer to obtain interfacial chemical bonding between the inner surface of the outer layer and an adjacent outer surface of the inner layer during the casting and subsequent cooling steps.

Another object of the present invention is the provision of an automotive interior trim article containing a panel-like structure, and in particular the provision of a panel-like structure having an exterior surface which simulates the appearance and feel of authentic leather, yet is cooperatively associated with a secondary restraint system to permit an air bag of the secondary restraint system to deploy upon collision of the automobile.

In accordance with the principles of the present invention, this object and other objects are achieved by providing an article comprising a panel-like structure mountable in an automobile vehicle to form a part of the interior of the vehicle. The panel-like structure has an exterior surface at least partially exposed to the vehicle interior and an interior surface which is hidden from the vehicle interior when the panel-like structure is mounted to the automobile vehicle structure.

The panel-like structure comprises a reinforcing (or rigid) substrate and layered composite structure, with a soft cellular polyurethane foam layer optionally interposed therebetween. The reinforcing substrate includes at least one hidden door, and has one surface defining the interior surface of the panel-like structure and an opposite surface united with the layered composite structure. The layered composite structure comprises an outer layer and an inner layer. The outer layer defines at least a portion of the exposed exterior surface of the panel-like structure, and has the desired touch, color, and configuration of the panel-like structure, as well as exhibiting good chemical resistance. The outer layer comprises a substantially dried, light-stable, crosslinked polyurethane formed from a water-dispersed composition comprising at least one desired coloring agent, at least one light-stable aliphatic thermoplastic polyurethane containing one or more pendent hydroxyl and/or carboxyl functional groups, and a heat-activated reactive crosslinking monomer (preferably carbodiimide). The water-dispersed composition is heated and dried on the mold surface to induce crosslinking and form the outer layer. The inner layer, which is thicker than the outer layer, comprises a first portion formed from a rotationally cast polymeric composition containing suitable additives and having a structurally weakened tear seam defined in an inner surface thereof, and an optional second portion disposed in the structurally weakened tear seam and formulated from a material having a tensile strength less than that of the first portion. In a preferred embodiment of the present invention, the heat-activated reactive crosslinking monomer serves to crosslink the polymer or additives in the cast polymeric composition with the light-stable aliphatic polyurethane of the outer layer. Consequently, the inner layer has a surface adjacent to and interfacially chemically bonded with an inner surface of the outer layer. The interfacial chemical bonds are formed by timely gelling and fusing the cast polymeric composition against the inner surface of the outer layer while the outer layer is retained on the mold surface.

The structurally weakened tear seam of the inner layer can be formed by placing a seam-defining structure in contact with or in spaced relation to an inner surface of the outer layer during casting of the cast polymeric composition. The structurally weakened tear seam is positioned to generally correspond to and overlay at least the parting edges of the hidden doors, such that upon actuation of a concealed secondary restraint system, an air bag of the secondary restraint system opens the hidden doors into the passengers' compartment of the vehicle and fractures the composite structure along the structurally weakened tear seam to create a passageway which permits deployment of the air bag into the passengers' compartment of the vehicle.

Since the layered composite structure provided in accordance with the above-discussed embodiment has an outer layer that can be uniformly sprayed onto heated mold surface without requiring a seam-defining structure for forming a structurally weakened seam in the outer layer, the outer layer of the composite structure does not exhibit the non-uniform porosity that characterizes conventional skins. Further, the outer layer assists in masking and concealing the non-uniform porosity and/or differentials in aging between the portion of the inner layer defining the structurally weakened tear seam and the low tensile strength material filling the tear seam.

The layered composite structure of the present invention also exhibits excellent chemical, scuff and mar resistance to external influences. Further, appropriate additives can be introduced into one or both layers of the layered composite structure to provide the composite structure with the non-reflective and low gloss surface appearance desired for such panel-like structures. Furthermore, both the inner and outer layers of the layered composite structure are characterized by excellent extensibility, such that the composite structure can withstand indentation and flexure during use without resulting in cracking in the outer layer over a wide temperature range, such as from −30° C. to 120° C.

The principles of the present invention enunciated above are applicable to all types of skinned panel structures through which an air bag might deploy, but have particular applicability to instrument panels (also referred to as dashboards), door panels, steering wheels, pillar covers, headliners, and rear interior quarter panels. Moreover, the principles of the present invention are applicable to various types of vehicles, including passenger cars, trucks, vans, utility vehicles, and others.

These and other objects, features, and advantages of the present invention will become apparent from the following detailed description when taken in conjunction with the accompanying drawings which illustrate, by way of example, the principles of the present invention.

BRIEF DESCRIPTION OF THE DRAWING

The accompanying drawings illustrate the present invention. In such drawings:

FIG. 7 is a sectional view similar to FIG. 6 showing a step of forming an inner layer having an inner surface with a structurally weakened tear seam defined therein by gelling and fusing a composition comprising at least dry powder polymeric resin and suitable additives against an inner surface of the outer layer while the outer layer is retained on the mold surface with a seam-defining layer spaced therefrom;

FIG. 8 is a sectional view similar to FIG. 7 showing a step of electrostatically spraying the structurally weakened tear seam material into the tear seam channel defined in the inner layer;

DESCRIPTION OF THE PREFERRED EMBODIMENTS

Figure 1:
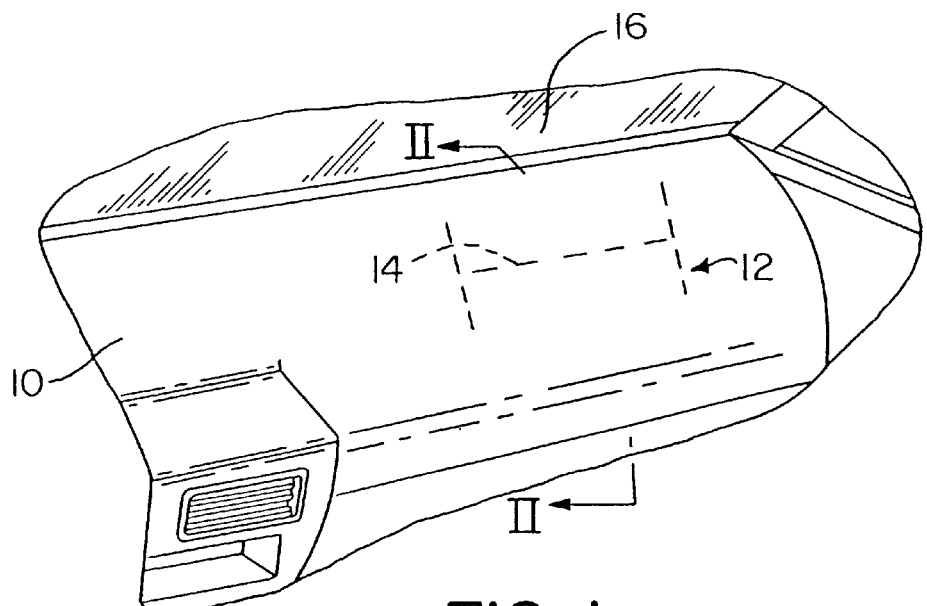
FIG. 1 is a perspective, partially phantomed view of a completed vehicle instrument panel constructed in accordance with the present invention.

Referring now more particularly to the drawings, there is shown in FIG. 1 a panel-like structure comprising a vehicle instrument panel, generally designated by reference numeral 10, made by a method according to the principles of the present invention. In this embodiment of the invention, the panel-like structure 10 is shown in a top mount position. The structure 10 includes pivotable doors 12 having edges that define an H-shaped pattern 14. In this top mount position, the doors 12 underlay a sloped windshield 16. Although shown in the upper portion 14 of the instrument panel 10, it is understood that the doors 12 could also be formed in the front portion of the instrument panel 10, which constitutes a mid mount position.

Figure 2:
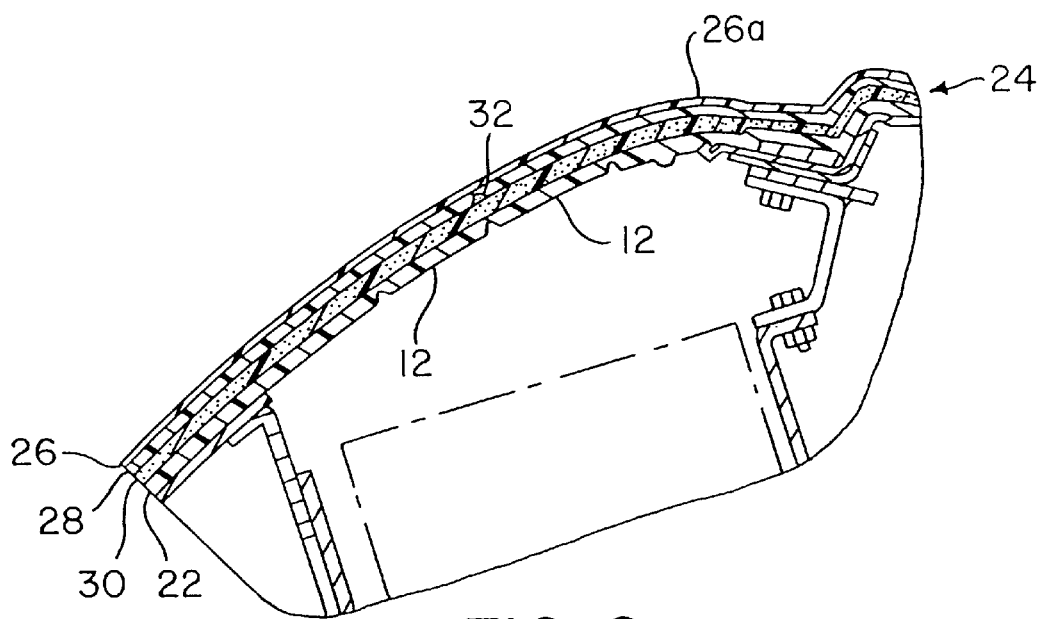
FIG. 2 is a sectional view of the instrument panel of FIG. 1 taken along line II—II.
Figure 3:
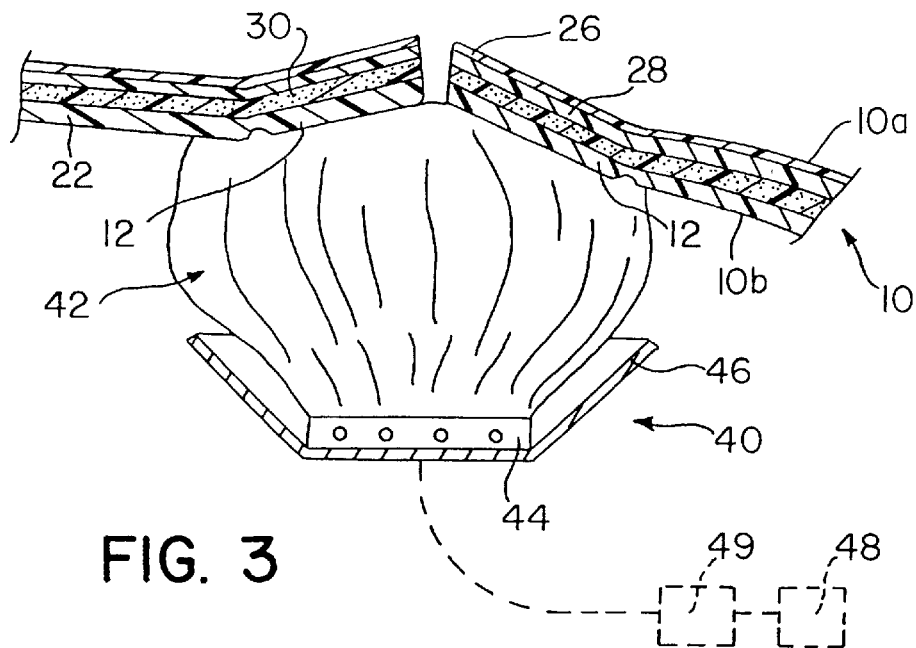
FIG. 3 is a sectional view like FIG. 2, except showing the air bag in a partially inflated deployment position.

As shown in cross-section in FIGS. 2 and 3, the panel-like structure 10 has an exterior surface 10a exposed to the vehicle interior and an interior surface 10b which is hidden from the vehicle interior when the panel-like structure 10 is mounted in the automobile vehicle. The panel-like structure 10 includes a rigid (or reinforcing) substrate 22 having one surface defining the interior surface 10b of the panel-like structure 10. A portion of the rigid substrate 22 can define the pivotable doors 12. Alternatively, the pivotable doors 12 can be formed separately from the rigid substrate 22, and attached to the rigid substrate 22 via, for example, hinges or the like (not shown). In the illustrated embodiment, when viewed from the backside of the rigid substrate 22, the doors 12 define an H-pattern; however, it is understood that the doors 12 can contain other configurations and can be displaced by other means (other than pivotal movement). For example, other possible configurations include X, C, U, and inverted U shapes.

The panel-like structure 10 further includes a layered composite structure, generally designated by reference numeral 24 (FIG. 2), comprised of an outer layer 26 having an outer surface 26a defining at least a portion of the exposed exterior surface 10a (FIG. 4) of the panel-like structure 10 and an inner layer 28. At least a portion of the outer layer 26 is exposed to the vehicle interior, while a portion of the outer layer 26 may be hidden from view by a decorative or other masking item. Finally, an intermediate layer 30 comprising a relatively rigid (or semi-rigid) polyurethane cellular foam filler is interposed between the inner layer 28 and the rigid substrate 22.

As further illustrated in the drawings, the inner layer 28, which is relatively thick in comparison to the outer layer 26, has an outer surface 28a adjacent to and interfacially chemically bonded with an inner surface 26b of the outer layer 26. The inner surface 28b of the inner layer 28 has at least one structurally weakened seam 28c formed therein, the structurally weakened seam 28c (FIG. 7) having a thickness less than that of the surrounding portions (unnumbered) of the inner layer 28. The structurally weakened seam 28c preferably has a shape that substantially corresponds to the shape of the edges of the doors 12 that part from the rigid substrate 22 during pivotable movement of the doors 12 (e.g., an H-shape in the illustrative embodiment). A lower density or lower strength tear seam material (also referred to as a filler material) 32 having a lower tensile strength than the inner layer 28 can be disposed in the structurally weakened seam 28c. Preferably, the tensile strength of the filler material is about 50% lower than that of the remaining portion of the inner layer 28.

In the illustrated embodiment of FIG. 3, an air bag deployment system 40 used in combination with the present invention can include any conventional system that can be accommodated behind a panel-like structure and is capable of deploying an air bag 42 at an adequate rate to protect the vehicle occupants. A typical system 40 can include, for example, a stationary gas generator or canister 44 situated in a housing 46 mounted on a suitable vehicle component (not shown). When the vehicle is impacted, an impact sensor 48 actuates the gas generator 44, causing the gas generator 44 to condition a controller 49 to initiate gas generation and expel a suitable inflatant gas into the interior of the air bag 42.

Figure 4:
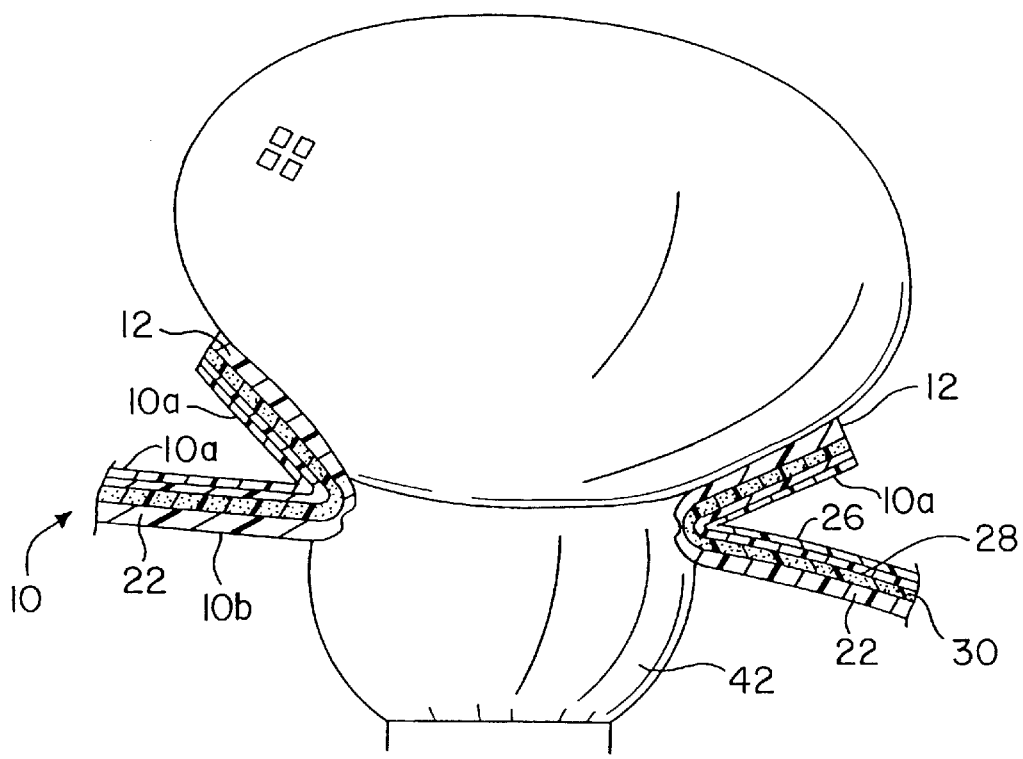
FIG. 4 is a sectional view like FIG. 3, except showing the air bag in a fully inflated deployment position.

As shown in FIGS. 3 and 4, as the air bag 42 is inflated from its folded inoperative state to a fully inflated state, the expanding air bag 42 impacts against the backside of the panel-like structure 10. The force of the impact displaces the doors 12 into the passengers' compartment of the vehicle and thereby fractures the composite structure 24 along the portion of the inner layer 28 and the lower strength tear seam material 32 (FIG. 2) to create a passageway (unnumbered). The formed passageway permits expansion of the air bag 42 into the passengers' compartment of the vehicle and protects the occupants from violent collision against the panel-like structure 10 or windshield 16.

Figure 5:
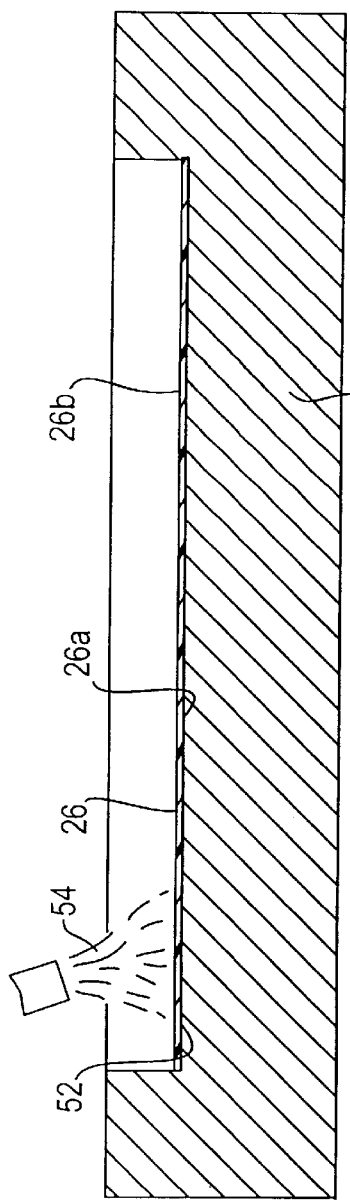
FIG. 5 is a sectional view of a mold surface showing a step of applying a water-dispersed polyurethane composition to a heated mold surface to form a crosslinked light-stable polyurethane outer layer in accordance with the present invention.

As shown in FIG. 5, the method of the present invention utilizes a first mold component or part 50 having a first mold surface 52. The first mold component 50 preferably is formulated by electrolytically depositing nickel over a rigid cast epoxy substrate which is secondarily removed at the end of the deposition/plating process to yield a self-supporting mold capable of being mounted and controlled in a tooling module. The first mold surface 52 has a complementary configuration to the desired configuration of the outer layer 26, and is grained to define a texture that substantially complements the desired texture of the outer layer 26 and simulates real leather.

FIG. 5 illustrates the first step in the present invention and, in accordance with this step, the outer layer 26 is obtained by applying, preferably by spraying, a water-dispersed composition 54 onto the first mold surface 52. The water-dispersed composition 54 comprises at least one light-stable aliphatic thermoplastic polyurethane containing one or more pendent hydroxyl and/or carboxyl functional groups, at least one desired coloring agent, and at least one heat-activated reactive crosslinking monomer. Carbodiimide (H—N=C=N—H), also known as cyanamide, preferably serves as the heat-activated reactive crosslinking monomer. Other suitable crosslinking monomers, such as aziridine, can also be used.

Application of the water-dispersed composition 54 onto the heated first mold surface 52 induces chemical reaction between the one or more pendent hydroxyl and/or carboxyl functional groups of the light-stable thermoplastic polyurethane and the heat-activated reactive crosslinking monomer to thereby produce a crosslinked light-stable polyurethane. The first mold surface 52 should be heated to a sufficient temperature to drive the crosslinking reaction, but should not be so high as to cause delamination of the composition 54 from the mold surface 52. Preferably, the first mold surface 52 is heated to a temperature in a range of from about 140° F. (60° C.) to about 160° F. (71.1° C.). The heating of the first mold surface 52 to such elevated temperatures prior to application of the water-dispersed composition 54 thereto also serves to melt and disperse semi-permanent mold releasing agents, such as microcrystalline wax mold releasing agents, applied to the first mold surface 52. The heated mold surface 52 thereby serves to evaporate the wax dispersants and leave a thin residue that does not collect in the intricate grain detail of the first mold surface 52.

The water-dispersed composition 54 can be prepared by withdrawing the light-stable aliphatic thermoplastic polyurethane and the heat-activated reactive crosslinking monomer from separate storage chambers in continuous, metered streams, and mixing these constituents immediately prior to contact with the first mold surface 52. Alternatively, the light-stable aliphatic thermoplastic polyurethane and the carbodiimide constituents can be stably premixed, or "hot-potted", for up to about 24 hours at room temperature before application. This technique is known as "hot-potting" since the thermoplastic polyurethane and carbodiimide slowly react with each other at room temperature in a spray pressure pot. If the admixture is hot-potted for more than about 24 hours at room temperature before application of the water-dispersed composition 54 onto the first mold surface 52, the resulting crosslinked light-stable polyurethane exhibits inferior solvent and wear resistance properties and extensibility and may not provide an idealized bond to the inner layer 28. The water-dispersed composition 54 may be formed from a colloid solution of resin particles, which is added to water to disperse the resin particles in the water.

Figure 6:
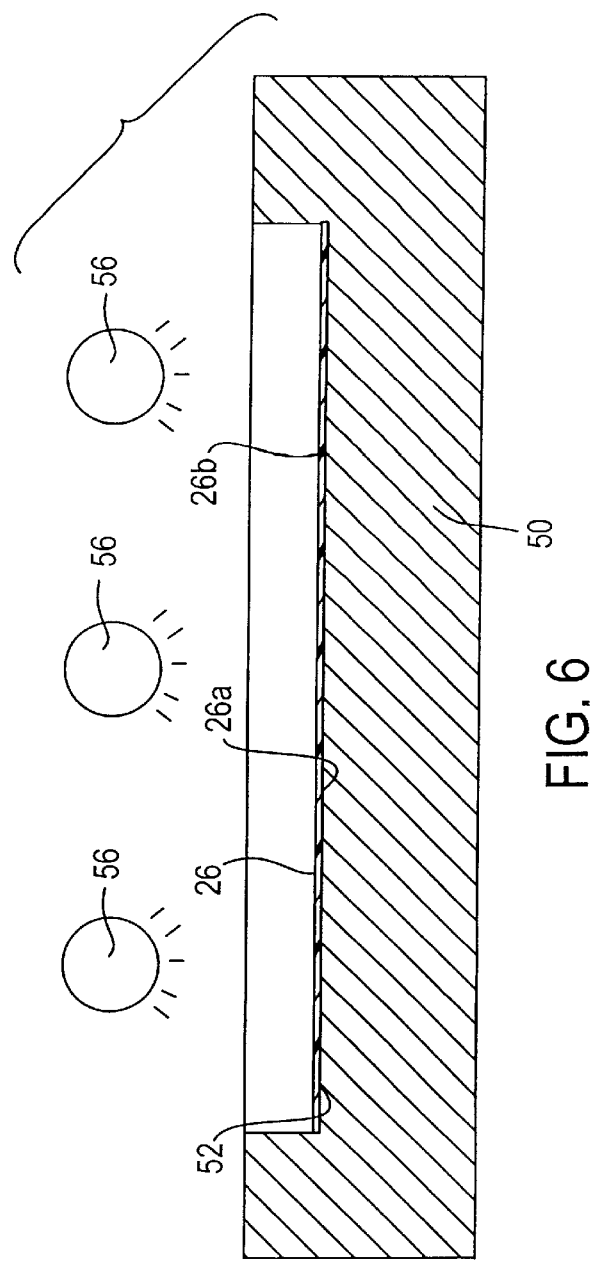
FIG. 6 is a sectional view similar to FIG. 5 showing a step of drying the polyurethane outer layer.

Once the crosslinked light-stable polyurethane has been formed on the first mold surface 52, the water-dispersed composition 54 is substantially dried while being retained on the first mold surface 52 to obtain the outer layer 26. As shown in FIG. 6, the crosslinked light-stable polyurethane can be subjected to a heat source 56 to induce evaporation of the water and solvent therefrom and coalesce the resin particles to form the outer layer 26 with the outer surface 26a adjacent to the first mold surface 52. Although not shown in FIG. 6, such heat source 56 is preferably integrated with the first mold 50, and preferably heats the first mold surface 52 to an elevated temperature of about 150° F. (65.6° C.) or higher. At least a portion of the outer surface 26a of the outer layer 26 has the desired touch, color, and grain-like configuration of the panel-like structure 10.

Generally, the outer layer 26 has a thickness in a range of from about 1.0 mils to about 1.5 mils (that is, from about 0.001 inch to about 0.0015 inch; or from about 0.0025 cm to about 0.0038 cm). The particular coloring agent selected can directly influence the desired thickness of the outer layer 26. Darker colors, such as grays and greens, usually only require a relatively small film thickness to mask the color of the hidden inner layer 28, whereas lighter colors such as reds and yellows usually dictate the provision of a relatively larger thickness to obtain an opaque, non-transparent outer layer 26 that conceals the inner layer 28 from view.

Referring to FIG. 7, the inner layer 28 having the structurally weakened seam 28c is then formed by gelling a polymeric casting composition 60 comprising a dry powder resin and suitable additives, as needed or desired, against the inner surface 26b of the outer layer 26 while the outer layer 26 is retained on the first mold surface 52 in a substantially dry state.

Figure 9:
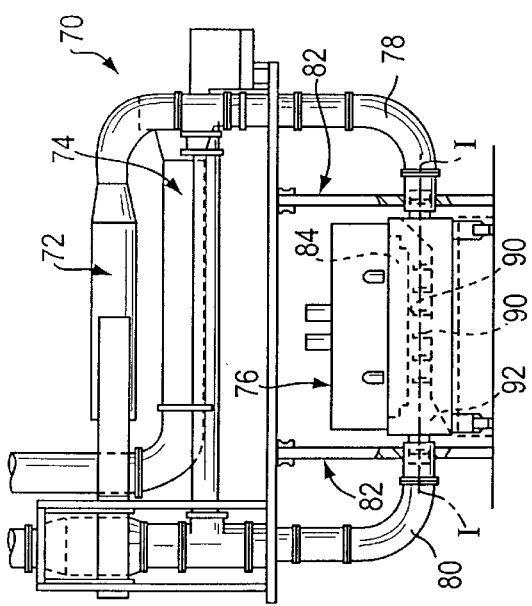
FIG. 9 is a schematic view of an assembly suitable for performing the gelling and fusing steps of the present invention.

The casting composition 60 can be cast by employing an assembly such as that illustrated in FIG. 9 and generally designated by reference numeral 70. As shown in FIG. 9, the illustrated assembly 70 includes a hot air supplying system 72 and a cool air supplying system 74, each of which is equipped with a blower (not shown). The hot and cool air supplying systems 72 and 74 are each fluidly connected to a module unit 76 via an air inlet conduit 78 and an air outlet conduit 80. Valves (not shown) can be provided for controlling the amount of hot and cool air provided to the module unit 76 by the hot and cool air supplying systems 72 and 74, respectively. Suitable valving systems are known in the art, and an example of such a valving system is described in U.S. Pat. No. 4,623,503, the complete disclosure of which is incorporated herein by reference.

The module unit 76 is rotatably supported about axis I—I by a stationary base 82, which is constructed and arranged to permit the module unit 76 to rotate about axis I—I. Suitable drive means (not shown) for rotating the module unit 76 are set forth in U.S. Pat. No. 4,217,325, the complete disclosure of which is incorporated herein by reference.

Figure 10:
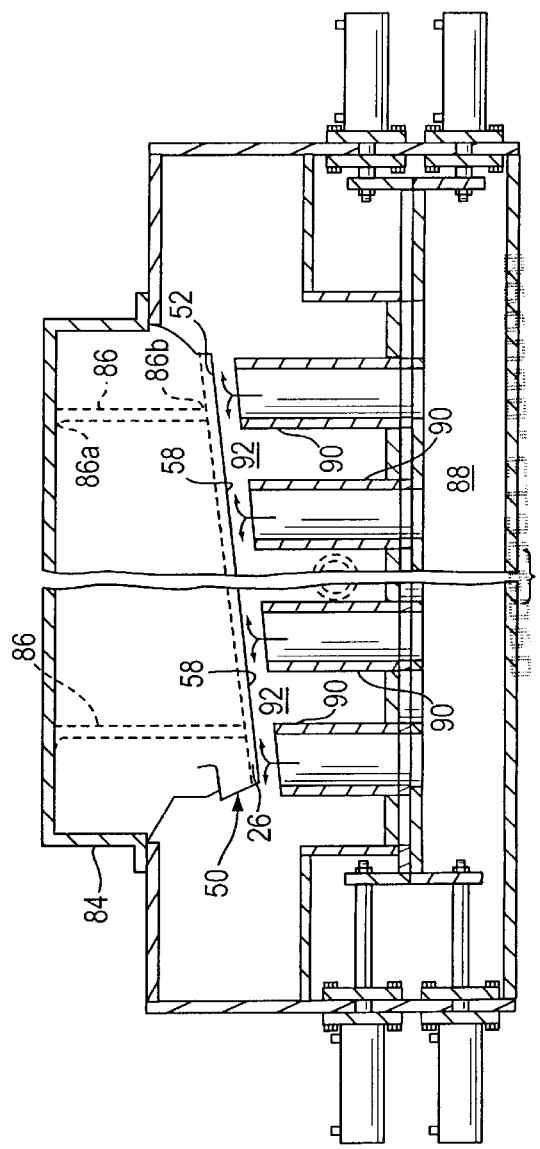
FIG. 10 is an enlarged view of a portion of the assembly illustrated in FIG. 9.

As shown in more detail in FIG. 10, the rotatable module unit 76 includes a powder box 84 which is configured to cover and seal at least the portion of the first mold surface 52 retaining the outer layer 26. The interior of the powder box 84 can be supplied with a charge of the casting composition 60 before bringing the box 84 into sealing engagement with the first mold component 52 to define a closed system.

A seam-defining structure 86 extends over a predetermined length from a proximal end 86a contacting the bottom surface of the powder box 84 to a distal end 86b. When the powder box 84 is connected to and covers at least the portion of the first mold surface 52 retaining the outer layer 26 to form the closed system, the distal end 86b of the seam-defining structure 86 is spaced from the outer surface 26a of the outer layer 26.

The air inlet conduit 78 is fluidly connected to an inlet plenum 88, which in turn is in fluid connection with one or more sets of air impingement nozzles 90. The air impingement nozzles 90 are disposed adjacent an opposing surface 58 of the first mold component 50. Each nozzle 90 contains a passage terminating in an opening. The air impingement nozzles 90 are generally constructed and arranged to receive air introduced into the inlet plenum 88 via air inlet conduit 78 and to distribute and discharge the air over a desired portion of the opposing mold surface 58 of the first mold component 50. An air outlet plenum 92 is provided for collecting air expelled from the air impingement nozzles 90 (after the air impacts the opposing mold surface 58) and conveying the air to the air outlet conduit 80.

In operation, a form of rotational casting, such as a fill, coat and dump process, can be employed. In accordance with this casting technique, the process involves rotating the module unit 76, including the powder box 84, about axis I—I. When the module unit 76 is rotated into an inverted position as shown in FIG. 10, the casting composition 60 is gravitationally transferred from the powder box 84 and onto the outer layer 26, which is retained on the first mold surface 52. A portion of the composition 60 is gelled against the outer layer 26, which has previously been heated to dry the outer layer 26 as described above, at a temperature hot enough to gel the portion of the composition 60 in contact with the outer layer 26. For example, the temperature for gelling a PVC or thermoplastic urethane composition can be in a range of from about 160° F. (71° C.) to about 200° F. (93° C.). The powder box 84 is then returned to its original position so that the casting composition 60 which has not adhered to the outer layer 26 gravitationally drops onto the powder box 84. This process is repeated until a desired thickness of the casting composition 60 has been gelled against the inner surface 26a of the outer layer 26.

Referring back to FIG. 7, a resultant build-up of the gelled casting composition 60 having a substantially uniform thickness (other than below the seam-defining structure 86) develops on the outer layer 26. Since the seam-defining structure 86 partially obstructs the gelling of the composition 60 in the space defined between the outer layer 26 and the distal end 86b of the seam-defining structure 86, the thickness of the build-up of gelled composition 60 in this space is less than that of the surrounding gelled composition 60. The structurally weakened seam 28c is thereby formed in the inner layer 28, but not the outer layer 26.

After the build-up has reached a desired thickness, the powder box 86 can be disengaged from the first mold 50 and the powder box 84 and the seam-defining structure 86 can be removed from the module unit 76.

Thereafter, a filler material 32 can be deposited into the structurally weakened seam 28c via, for example, electrostatic spraying. The filler material 32 is selected such that, after fusing and cooling the inner layer 28, the filler material 32 will have a lesser density and/or exhibit a lesser tensile strength than the inner layer 28 formed from the casting composition 60. The base polymer selected for the filler material 32 should be miscible with the composition 60. Preferably, the base polymer of the filler material 32 is the same base polymer used in the composition 60. The density and/or tensile strength of the filler material 32 can be lowered by including fillers, such as silica, glass beads, talc, and others in the filler material 32, and/or by adding blowing agents, such as azo-blowing agents, into the filler material 32.

The gelled composition 60 is then fused in accordance with known practice. Fusing can be performed, for example, by heating the first mold 50 to a temperature of about 400° F. (204.4° C.) or more. The fused composition 60 is thereafter cooled to provide the inner layer 28.

The heat necessary for the gelling and fusing steps is provided by the hot air supplying system 72 and is introduced into the module unit 76 via air inlet conduit 78. The hot air is forced through the inlet plenum 88 and the injection nozzles 90, and impacts against the opposing mold surface 58 of the first mold component 50, thereby transferring heat through the first mold component 50 and heating the outer layer 26 disposed on the first mold surface 52 of mold component 50. The air is removed from the module unit 76 through the outlet plenum 92 and air outlet conduit 80, and thereafter can be recycled to the hot air supplying system 72 for reheating.

After the gelling and fusing steps are completed, the valving system can be activated to disconnect the hot air supplying system 72 and connect the cool air supplying system 74. Cool air can then be supplied to the module unit 76 and impacted against the opposing mold surface 58 to cool the outer and inner layers 26 and 28.

The air flow rate, air temperature, nozzle diameters and spacing, distance between the nozzles and opposing mold surface 58, and similar process variables can each be manipulated to produce desired heating and cooling transfer effects. Suitable means for controlling these variables are known in the art and are disclosed, for example, in U.S. Pat. No. 4,621,995, the complete disclosure of which is incorporated herein by reference.

The casting composition 60 can be made from one or more base polymers that can be cast by conventional dry casting techniques. Suitable base polymers include, for example and without limitation, PVC, thermoplastic polyurethanes, thermoplastic polyolefins, thermoplastic elastomers, and any combination thereof. The casting composition 60 can also contain one or more additives. Preferably, at least one of the base polymers and/or the additives is highly reactive with unreacted functional groups of carbodiimide in the outer layer 26 that have not reacted with the pendent functional groups of the polyurethane of the outer layer 26. Unreacted functional groups of the carbodiimide penetrate into the inner layer 28 and provide reactive sites for crosslinking the polyurethane of the outer layer 26 with the casting composition 60. An interfacial chemical bond between the inner surface 26b of the outer layer 26 and the adjacent outer surface 28a of the inner layer 28 can thereby be formed. The layered composite structure 24 is thus obtained. If the crosslinking is performed under optimum crosslinking conditions, the boundary between the outer and inner layers 26 and 28 of the layered composite structure 24 can become visually indistinct, such that a transition phase appears at the interface of the two layers. As referred to herein, interfacial chemical bonding encompasses, but is not limited to, such crosslinking reactions in which the interfacial boundary between the outer and inner layers 26 and 28 is visually indistinct and inseparable.

Generally, provisions should be taken to ensure that adequate interfacial chemical bonding is achieved between the inner surface 26b of the outer layer 26 and the adjacent outer surface 28a of the inner layer 28. For example, once the carbodiimide is activated by heat, the crosslinking reaction between the carbodiimide and the pendent hydroxyl and/or carboxyl reactive groups of the thermoplastic polyurethane of the outer layer 26 goes to completion within minutes, leaving substantially no residual reactive sites in the carbodiimide for crosslinking the casting composition 60. Therefore, the casting composition 60 generally should be gelled and fused within six minutes, and preferably within two to four minutes, of completing the application of the water-dispersed composition 54 to the first mold surface 52. Significant delays in casting the composition 60 also can cause the outer layer 26 to constrict and delaminate from the first mold surface 52. As a consequence of delamination, the outer layer 26 will not have a shape that corresponds to the configuration of the first mold surface 52, and the entire layered composite structure 24 will have to be disposed of as scrap.

Generally, the inner layer 28 has a thickness in a range of from about 40 mils to about 60 mils (that is, from about 0.040 inch to about 0.060 inch; or from about 0.10 cm to about 0.15 cm).

Figure 11:
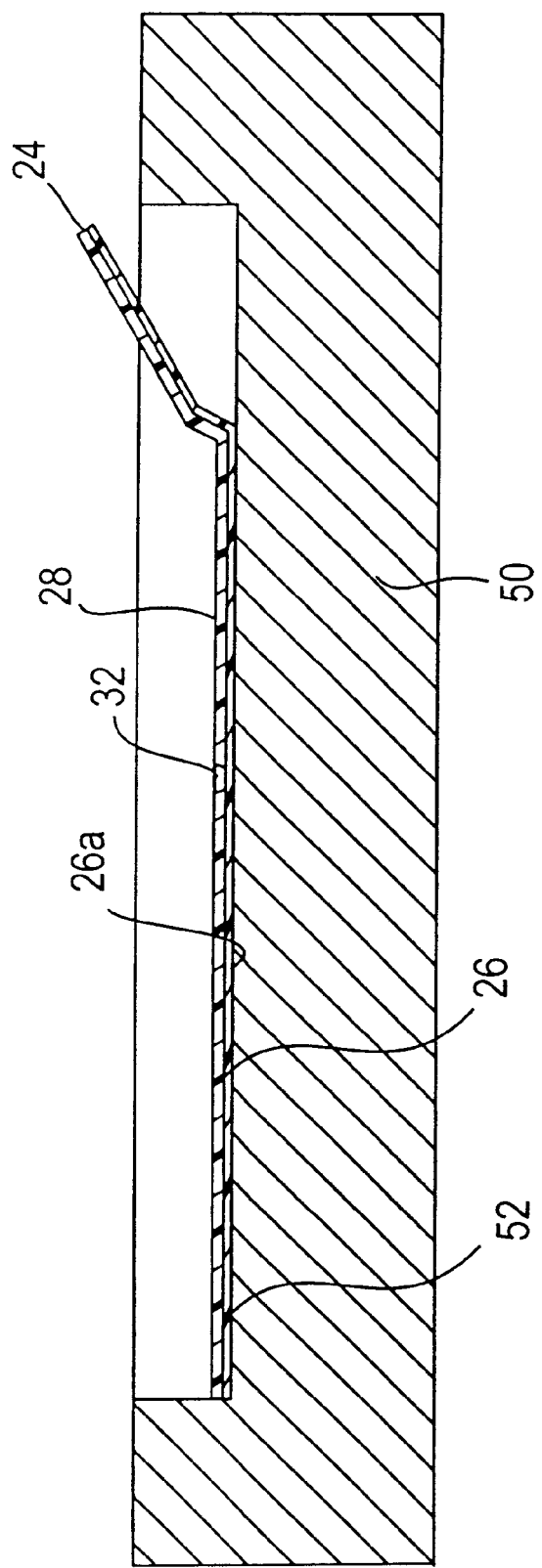
FIG. 11 is a sectional view similar to FIG. 8 showing a step of removing the combination of the inner and outer layers from the mold surface.

FIG. 11 illustrates the next step of the present invention. As shown in FIG. 11, the layered composite structure 24 is demolded (i.e., removed) from the first mold surface 52. Such demolding can take place at a mold temperature of, for example, about 140° F. (about 60° C.). The demolding process is often a relatively labor intensive, tedious, and time consuming task. Formation of tears in or undue stretching of the layered composite structure 24 during demolding can irreversibly ruin and thereby necessitate disposal of the layered composite structure 24 as scrap. Such demolding problems and inefficiencies are largely overcome by practice of the present invention, since the interfacial chemical bond between the outer layer 26 and inner layer 28 strengthens the layered composite structure 24 by discouraging separation of the outer and inner layer 26 and 28 during demolding procedures.

To enhance the releasibility from the first mold surface 52 further, the mold surface 52 can be pretreated with a releasing agent. Exemplary releasing agents include, without limitation, high molecular weight microcrystalline wax mold releases, such as Chem-Trend PRC 7140, supplied by Chem-Trend, Inc. of Howell, Mich., or PRC 2006, also supplied by Chem-Trend. These mold releasing agents dry quickly on a heated mold within about 5 to about 10 seconds and form a release barrier between the grained mold surface 52 and the outer layer 26. Care should be taken to avoid the accumulation of the mold releasing agent on the first mold surface 52 or excess solids content in the agent, since such accumulation or excess solids content tends to fill the interstices of the decorative, grained mold surface 52, thereby removing from the exterior surface of the panel-like structure 10 the appearance of the intricate, hair-like grained configuration of the mold surface 52. Further, the use of excess mold releasing agents can cause the agents to transfer from the first mold surface 52 to the layered composite structure 24 during demolding of the composite structure 24, thus requiring additional wash-removal and drying steps after demolding and hence a loss in productivity.

After being demolded from the first mold surface 52, the layered composite structure 24, including the combination of the outer and inner layers 26 and 28, can be examined for defects with a light source (not shown) while the layered composite structure 24 is positioned on a transparent substrate (not shown). Such defects usually are present as cosmetic blemishes in the outer layer 26, and may include the presence of tears and rupturable portions lacking sufficient thicknesses to withstand stresses associated with demolding or the further processing steps, especially the uniting step. If minor and isolated, such localized defects can be remedied by post application of additional water-dispersed composition 56 onto the backside 28b of the inner layer 28. Additionally, minor tears or thin areas can be repaired using thermoplastic, heat formable polyurethane tape on the backside 28b of the layered composite structure 24. Advantageously, the need to scrap the entire layered composite structure 24 is thereby averted. As a cautionary note, however, post application spray repair of surface 26a is generally undesirable and its use should be minimized to correcting localized defects, since post application spray repair can negate the grained leather-like appearance of the outer surface 26a of the outer layer 26 which is transcribed from the first mold surface 52.

As discussed in further detail below, the steps of demolding and examining of the layered composite structure 24 from the first mold surface 52 are not required to be conducted immediately subsequent to the formation of the layered composite structure 24. For example, the layered composite structure 24 optionally can be maintained against the first mold surface 52 until completion of the panel-like structure 10.

Figure 12:
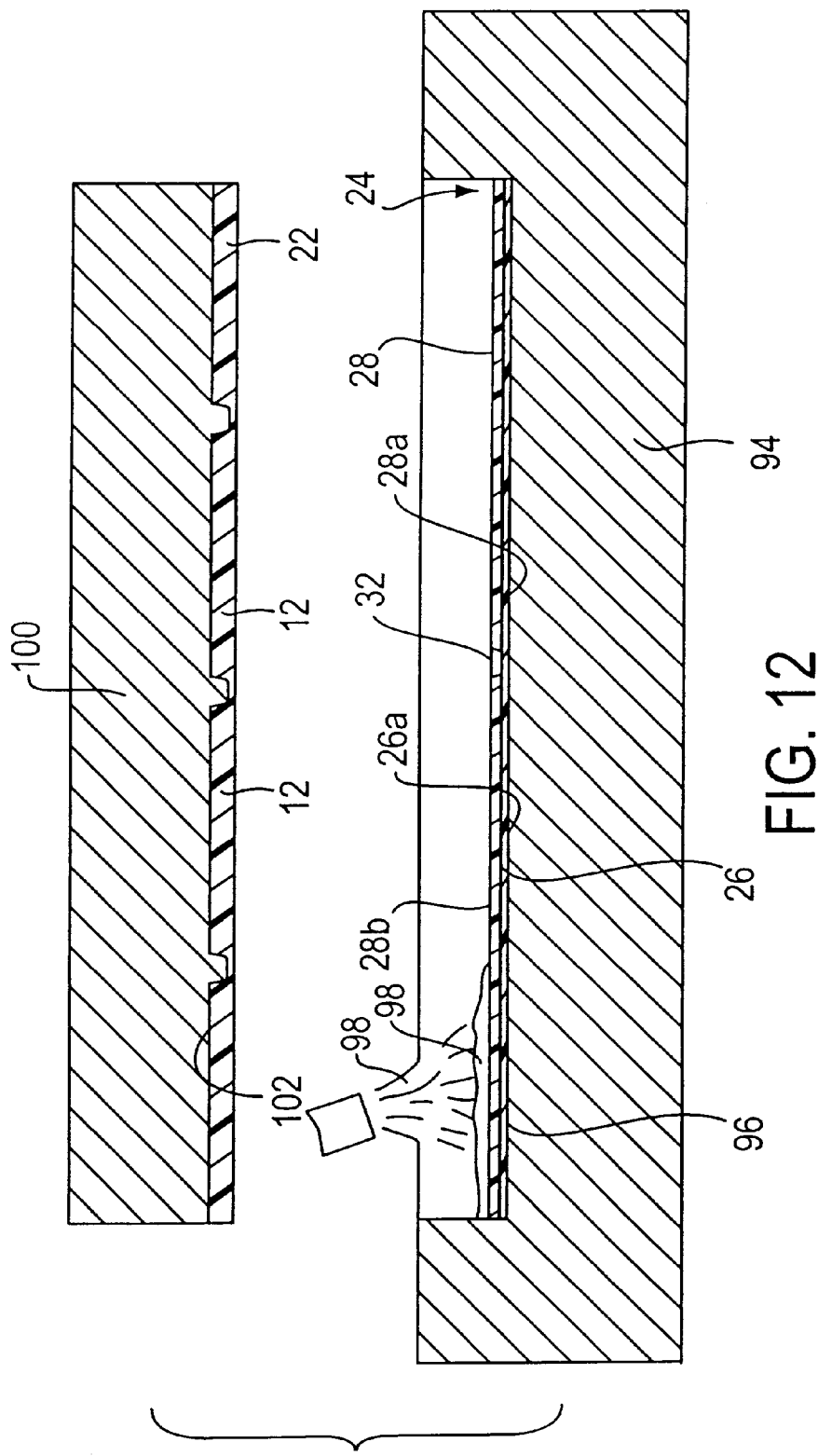
FIG. 12 is a sectional view of a second mold surface showing a step of obtaining a relatively rigid polyurethane cellular foam intermediate layer by applying a reaction mixture to the inner layer while the combination of the inner and outer layers are disposed on a second mold surface in accordance with an embodiment of the method of the present invention.

After the layered composite structure 24 is demolded from the first mold surface 52 and examined, the layered composite structure 24 is placed on a second mold surface 96 of a second mold part 94. As shown in FIG. 12, the second mold surface 96 also is shaped to having a complementary configuration to the outer layer 26. Then, a reactive mixture 98 for forming a semi-rigid cellular foam, such as a polyurethane semi-rigid cellular foam, is applied to an inner surface 28b of the inner layer 28 while the composite structure 24 is disposed on the second mold surface 96 to form the intermediate layer 30. The reactive mixture 98 can be applied, for instance, by employing high impingement mixing and a mix-head nozzle. The second mold component 94 is generally heated to a temperature in a range of from about 35° C. to about 45° C., and more preferably in a range of from about 35° C. to about 40° C., during application of the reactive mixture 44. The mixture 44, which is typically relatively viscous, is in a transient state of reaction during application to the second mold component 94 and begins to foam within seconds of application.

Although the desired thickness of the intermediate layer is partially dependent upon the intended use of the panel-like structure 10, generally the intermediate layer can have a thickness in a range of from about 5 mm to about 12 mm.

Figure 13:
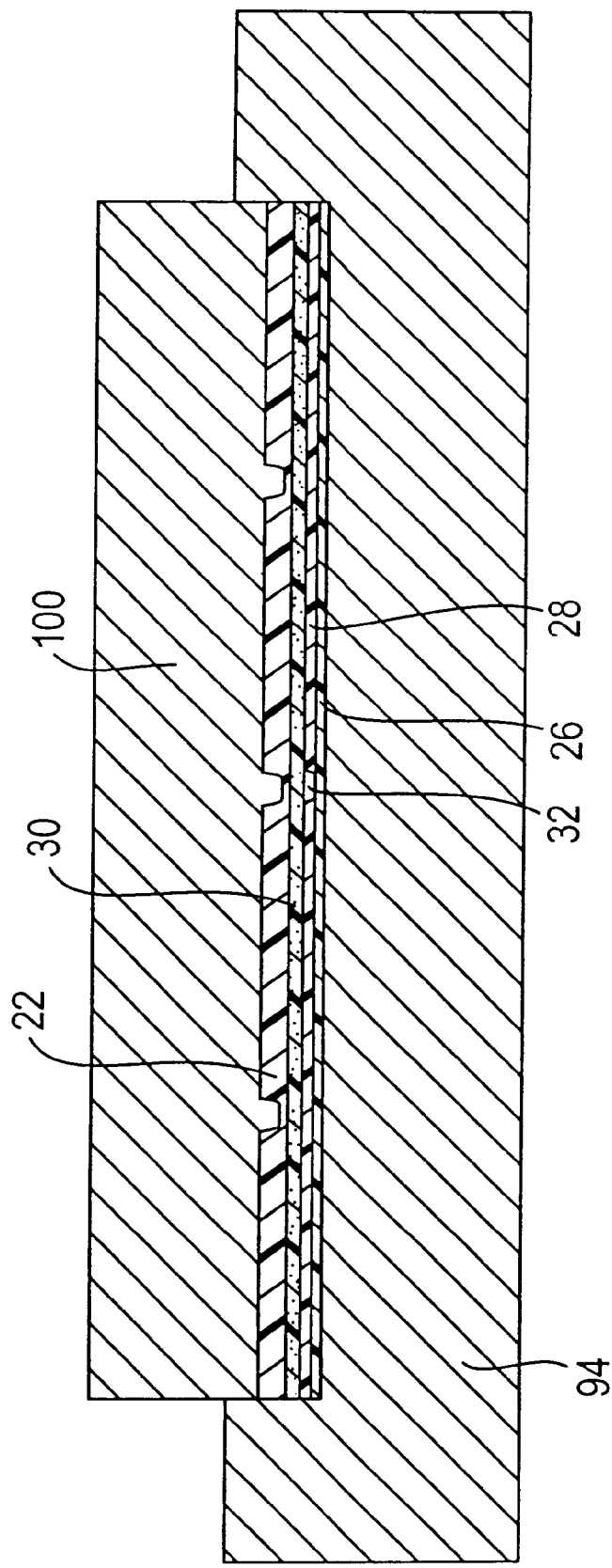
FIG. 13 is a sectional view showing a step of uniting the combination of the inner and outer layers on the second mold surface with a pre-formed relatively rigid substrate disposed on a third mold surface.

Once the reactive mixture 98 has been applied to the layered composite structure 24 located on the second mold surface 96, a third cooperating mold part or component 100 carrying the pre-formed rigid substrate 22 having a doors 12 is moved into cooperating relation with the second mold component 94, as shown in FIG. 13. The third mold component 100 has a third mold surface 102 (FIG. 12) which has a complementary configuration to the interior surface 10b of the panel-like structure 10. Thereafter, the reactive mixture 98 is foamed and cured, preferably under heat of approximately 110° F. (43.3° C.) and a self-generated cavity pressure of about 0.8 atm to form the intermediate layer 30. The semi-rigid polyurethane cellular foam serves to unite the layered composite structure 24 with the pre-formed rigid substrate 22 disposed on the third mold surface 102. The panel-like structure including the combination of the layered composite structure 24, the rigid substrate 22, and the intermediate layer 30 then can be removed from the mold parts 94 and 100 and additional components can be affixed.

In its broadest aspects, several variations and modifications to the above-discussed article can be implemented without departing from the scope of the present invention. For example, a non-foamable adhesive can be selected for uniting the layered composite structure 24 to the rigid substrate 22. Such non-foamable adhesive or the polyurethane semi-rigid cellular foam 30 can also contain structurally weakened portions that facilitate the opening of the doors 12.

In accordance with another variant embodiment, multiple water-dispersed compositions containing different coloring agents can be respectively applied to different portions of the panel-like structure to produce discretely masked colors. Where the selected color or colors are to be changed, in practice it has been found that minimal downtime (on the order of about 0.5 hours) is required.

In accordance with still another variant embodiment, the outer layer 26 can exhibit a dualtone or multitone appearance. This variant embodiment can be accomplished, for example, by abrasive treatment of a portion of the mold surface of the tooling. The greater the amount of abrasive treatment, the duller the appearance of the outer layer 26. A dualtone appearance can be especially desirable for instrument panels, since the upper region of an instrument panel generally should have a low gloss in order to reduce reflectance and veiling glare.

Several variations and modifications to the above-discussed method also can be practiced without departing from the scope of the present invention. For example, as mentioned above, the layered composite structure 24 can be retained in the first mold component 50 instead of being demolded and transferred to a second mold component 94 for the uniting step. In accordance with another variant embodiment of the present invention, the layered composite structure 24 can be returned to the first mold component 50 after being examined and treated.

In accordance with another variant of the present invention, a secondary or alternative heat source can be applied for activating the reaction between the light-stable aliphatic thermoplastic polyurethane and the heat-activated reactive crosslinking monomer. For example, the water-dispersed composition 56 can be preheated before being applied to the first mold surface 52, such that the first mold surface 52 does not have to be heated to initiate the reaction between the heat-activated reactive crosslinking monomer and the light-stable aliphatic thermoplastic polyurethane.

In accordance with yet another variant embodiment of the present invention, techniques other than casting of dry powder material can be employed for applying the casting composition 60 to the outer layer 26. For example, the dry powder material can be replaced with pellets or other suitable forms of material. In a preferred embodiment, micropellets with diameters in the range of 0.008 inch to 0.020 inch may be cast. U.S. Pat. No. 5,597,586, the complete disclosure of which is incorporated herein by reference, describes a method of making these micropellets.

In addition, in accordance with an alternative embodiment, the seam-defining structure 86 can be placed in contact with the inner surface 26b of the outer layer 26. Suitable seam-defining structures 86 or gaskets for this alternative embodiment are disclosed in U.S. Pat. Nos. 4,634,360, 4,692,293, and 4,925,151, the complete disclosures of each of which are incorporated herein by reference. After removing the seam-defining structure 86, the resultant space can be filled with the tear seam material.

The illustrated embodiment of the present invention can also be modified by applying the reactive mixture 98 for forming the polyurethane semi-rigid cellular foam 30 to the surface of the rigid substrate 22 instead of the layered composite structure 24. Alternatively, the second and third mold components 94 and 100 can be cooperatively engaged to define a cavity between the inner surface 28b of the inner layer 28 and the outer surface of the substrate 22, with the reactive mixture 98 thereafter being injected between the rigid substrate 22 and the composite structure 24.

In order to further elucidate the decorative automotive interior trim article and method of the present invention, the following discussion specifies suitable and preferred constituents and conditions for making the article of the present invention and for carrying out the process of the present invention.

The water-dispersed composition 56 used to prepare the outer layer 26 comprises at least one light-stable aliphatic thermoplastic polyurethane, at least one desired coloring agent, and at least one reactive crosslinking monomer. The light-stable aliphatic thermoplastic polyurethane is preferably prepared from a high molecular weight aliphatic thermoplastic polyurethane containing hydroxyl and/or carboxyl pendent functional groups which are chemically reactive with the carbodiimide. The average molecular weight of the thermoplastic polyurethane can be in a range of from about 5000 to about 7000, and more preferably about 6000. An exemplary water-dispersed composition comprising a thermoplastic polyurethane and carbodiimide can be obtained from C.F. Jameson & Company, Inc. of Bradford, Mass. under the trade designation JAMESON WVF SERIES FLEXCOAT IMC. The desired weight ratio of thermoplastic polyurethane to carbodiimide for this particular composition is about 8 to 1 by volume (equivalent ratio of 1.44 thermoplastic polyurethane to 1.08 carbodiimide on a dry basis).

The water-dispersed composition 56 can be prepared by providing the thermoplastic polyurethane component as a colloidal solution in a solvent such as N-methyl pyrrolidone, then dispersing the solution by adding water, the coloring agent, and conventional additives, if desired. Sufficient water can be added so that the solvent concentration in the water-dispersed composition 56 is about 13.9% by weight, and about 35% by weight after drying.

The optional additives in the water-dispersed composition 56 can include, without limitation, any combination of the following: heat and ultra-violet light stabilizers, pH stabilizers to maintain an alkaline state of dispersion, plasticizers, antioxidants, dulling agents, surfactants, colloidal protectants to maintain particles in suspension, carbon black, thixotropic agents (e.g., hydroxy methyl cellulose), and fillers such as clay particles.

The water-dispersed composition 56 can contain, for example, about 20% to about 30% solids by weight, and more preferably about 24% solids by weight, about 10% to about 80% water by weight, and more preferably about 54% water by weight, and about 9 to 15% solvents by weight, depending on desired color and additives. An insufficient amount of water in the composition 56 can adversely affect the viscosity of the composition 56 and thus adversely affect the application of the water-dispersed composition 56 onto the first mold surface 52. On the other hand, an excess amount of water in the water-dispersed composition 56 can significantly alter the sprayability and coating efficiency of the water-dispersed composition 56 to prolong the time needed to dry the outer layer 26.

The water-dispersed composition 56 can be prepared by adding to the thermoplastic polyurethane solution a solution comprising the carbodiimide, which can include, for example, glycol ether acetate and/or xylene as the solvent. When combined and activated with heat, the reactive crosslinking monomer preferentially reacts with the hydroxyl and/or carboxyl groups of the thermoplastic polyurethane to crosslink the thermoplastic polyurethane with itself or with the base polymer and/or additive of the casting composition 60.

As mentioned above, the base polymer of the casting composition 60 can include, for example and without limitation, PVC, thermoplastic polyurethanes, thermoplastic polyolefins, thermoplastic elastomers, and any combination thereof.

PVC Composition

Where PVC is selected as the base polymer, the casting composition 60 can include one or more plasticizers. In a preferred embodiment, the plasticizers selected for the present invention are capable of reacting with the carbodiimide in the outer layer 26, so that the carbodiimide can successfully crosslink the polyurethane of the outer layer 26 with the plasticizer of the casting composition 60. Exemplary plasticizers include, without limitation, plasticizers having one or more pendent hydroxyl or carboxyl functional groups. These plasticizers are preferably incorporated around the backbone of the base polymer as an internal lubricant.

Preferably, both a low molecular weight plasticizer and a medium molecular weight plasticizer are included in the casting composition 60 having PVC as its base polymer. The low molecular weight plasticizer is selected to provide low temperature flexibility, so that performance of the inner layer 28 at low temperatures, such as −30° C., is not hindered. An exemplary low molecular weight plasticizer is di-2-ethylhexylphthalate (also known as DUP). On the other hand, the medium molecular weight plasticizer is selected to provide high temperature stability to the inner layer 28. An exemplary medium molecular weight plasticizer is trioctyl-trimellitate (TOTM).

The amount of low molecular weight plasticizer should be maintained fairly low so as to reduce volatilization and, consequently, window fogging. For example, the weight ratio of low molecular weight plasticizer to PVC base resin in the casting composition 60 can be from about 0.25:100 to about 1:100. The weight ratio of medium molecular weight plasticizer to PVC base resin in the casting composition 60 can be in a range of from about 10:100 to about 40:100, and more preferably in a range of from about 20:100 to about 40:100. If an insufficient amount of medium molecular weight plasticizer is used, the inner layer 28 may not exhibit adequate high temperature aging properties, resulting in, for example, premature stiffening of the inner layer 28 after exposure to elevated temperatures. On the other hand, if an excess amount of medium molecular weight plasticizer is used, the article surface may tend to gloss at elevated temperatures, creating unacceptable surface reflectance.

Where PVC is selected as the base polymer of the casting composition 60, the casting composition 60 can be prepared by any suitable technique, including suspension or mass polymerization followed by drying to provide a white, free-flowing powder of PVC having, for example, an average particle size of about 350 µm. The resulting PVC powder can then be thoroughly mixed with the plasticizer to form the casting composition 60 by employing any suitable technique, such as high energy compounding. During compounding, the plasticizer is absorbed by the PVC and thereby causes the PVC to swell. Compounding can be performed, for example, at a temperature in a range of from about 150° F. (about 60° C.) to about 190° C. (about 88° C.).

The plasticizer selected should impart thermal stability to the PVC powder and be permanent to render the article flexible for the life of the application. Generally, PVC powder consists of discrete particle groups that, when subjected to excessive temperatures, decompose prior to melting. This decomposition liberates hydrogen chloride, which autocatalytically degrades the PVC. Since the PVC is melted during the gelling and fusing steps, a suitable internal plasticizer is mixed with and absorbed in the PVC powder prior to casting in order to inhibit thermal degradation of the PVC and provide the inner layer 28 with a soft, flexible, compressing feel.

Preferably, the plasticizer is bound in the PVC matrix with sufficient bond energy to form a permanent part of the polymer matrix and thereby permit the finished fused article to exhibit good flexibility and weathering at super- and sub-ambient conditions in use.

The casting composition 60 having PVC as its base resin can contain appropriate additives, including, by way of example and without limitation, any combination of the following: heat and ultra-violet light stabilizers, such as hydroquinones; internal lubricants, such as stearic acid; antioxidants; dulling agents; carbon black; and fillers, such as clay and/or diatomaceous earth. Other additives can also be introduced into the inner layer 28 to protect against oxidation and destabilization of the cast PVC. Such additives include barium, calcium, and zinc heat stabilizers, such as barium nonylphenate, calcium carboxylate, and zinc stearate. These and other additives can be included to form the dry resin material by using, by way of example and without limitation, a high intensity dry powder mixer such as a Henschel mixer.

In addition, the PVC composition 42 can comprise one or more copolymer alloys or blends of PVC and another polymer, such as one or more polyurethanes. Such copolymer alloys and blends can be prepared by techniques well known to those skill in the art, such as compounding.

Thermoplastic Polyurethanes

Where a thermoplastic polyurethane is selected as the base polymer for the casting composition 60, the thermoplastic polyurethane preferably contains at least one ethylenically unsaturated bond in its backbone and/or hydroxyl groups. In a preferred embodiment, the ethylenically unsaturated bond and/or hydroxyl groups of the thermoplastic polyurethane is/are capable of reacting with the carbodiimide in the outer layer 26, so that the carbodiimide can successfully crosslink the polyurethane of the outer layer 26 with the polyurethane of the casting composition 60. Exemplary thermoplastic polyurethanes include, without limitation, ESTANE (provided by B.F. Goodrich of Akron, Ohio) and PELLETHANE (provided by Dow Chemical Company of Midland Mich.).

The thermoplastic polyurethane of the casting composition 60 can be prepared by, for example, a prepolymerization technique, followed by drying, compounding, chopping, and grinding, to provide a free-flowing powder of thermoplastic polyurethane. Excess polyols can be provided in preparing the thermoplastic polyurethane of casting composition 60. As mentioned above, the hydroxyl groups of the excess polyols can serve to promote crosslinking and the chemical bonding between the outer layer 26 and the inner layer 28. The resulting thermoplastic polyurethane powder typically has a brownish appearance, and can possess, for example, a 425 mesh size. The powder can contain additives, as needed or required by the intended use, to form the composition 60 by employing any suitable technique, such as introducing the additives during prepolymerization. The weight ratio of the total additives to the base resin can be, for example, in a range of from about 3:100 to about 7:100, depending on the intended use and additives included.

The casting composition 60 including a thermoplastic polyurethane as its base polymer can contain appropriate additives, including, by way of example and without limitation, any combination of the following: heat stabilizers; flexibilizers, such as low molecular weight polyurethanes (incorporated into the backbone, for example, during the compounding or like step); antioxidants; dulling agents; carbon black; fillers, such as clay particles; and free flowing additives. Other additives can also be introduced into the inner layer 28 to protect against scorching. These and other additives can be included to form the dry resin material by using, by way of example and without limitation, a high energy extruder/chopper.

In similar fashion, other thermoplastic powders based upon polyolefins or elastomers may be formed. Extruded micropellets of the PVC, TPU, TPO, TPE, or other thermoplastic formulations or combinations thereof may be cast instead of the powder form.

Various blends of polyether polyols and polyisocyanates having suitable resilience properties can be employed to form the semi-rigid polyurethane cellular foam of the intermediate layer 30. For example, the polyisocyanate blend can include methylene diisocyanate. The semi-rigid polyurethane cellular foam also can contain appropriate additives, including, by way of example and without limitation, any combination of the following: surfactants, antioxidants, fillers, stabilizers, catalysts such as tin catalysts (e.g., dibutyl tin dilaurate) and primary and secondary amines (e.g., diethanolamine), and small amounts of foaming agents such as water. In this regard, it is noted that the polyols and catalysts contain small amounts of water and it is typical to include a small amount in the formulation. The water reacts with the polyisocyanate to generate carbon dioxide and thereby impart the cellular structure to the intermediate layer 30. Accordingly, a slightly stoichiometric excess of polyisocyanate can be provided to form the semi-rigid polyurethane cellular foam.

The rigid substrate 22 may be formed from any material possessing the requisite strength to reinforce and mount the outer layer 26, inner layer 28, and intermediate layer 30. Suitable materials include those with sufficient rigidity to permit the composite to be mounted into a vehicular substructure, including, by way of example, injection molded thermoplastics, such as, without limitation, a styrene maleic anhydride (SMA), acrylonitrile butadiene styrene (ABS), polycarbonates (PC), alloys of ABS-PC, reinforced reaction injection molded polyurethanes (RRIM), metals, metal alloys, wood-fiber composites, or any combination thereof.

The rigid substrate 22 may be formed from at least one polyolefin selected from the group consisting of polypropylene, ethylene-propylene copolymers, thermoplastic olefins (TPOs), and thermoplastic polyolefin elastomers (TPEs), with reinforcement nanoparticles dispersed within the polyolefin. The reinforcement nanoparticles generally comprise less than 15% of the total volume of the rigid substrate 22. The nanoparticles derive their name from the small magnitude of their dimensions. The nanoparticles comprise one or more generally flat platelets, with each platelet having a thickness of between about 0.7 and about 1.2 nanometers. Generally, the platelets each have an average thickness of approximately 1 nm thick, with an aspect ratio (which is the largest dimension divided by the thickness) of about 50 to about 300.

The nanoparticles (including the platelets) are derivable from larger layered mineral particles. Any layered mineral capable of being intercalated may be employed in the present invention. Layered silicate minerals are preferred. The layered silicate minerals that may be employed include natural and artificial minerals. Non-limiting examples of more preferred minerals include montmorillonite, vermiculite, hectorite, saponite, hydrotalcites, kanemite, sodium octosilicate, magadite, and kenyaite. Mixed magnesium and aluminum hydroxides may also be used. Among the most preferred materials is montmorillonite. Various other clays can be used, such as claytone H.Y.

To exfoliate the larger mineral particles into their constituent layers, different methods may be employed. For example, swellable layered minerals, such as montmorillonite and saponite are known to intercalate water to expand the inter layer distance of the layered mineral, thereby facilitating exfoliation and dispersion of the layers uniformly in water. Dispersion of layers in water is aided by mixing with high shear. The mineral particles may also be exfoliated by a shearing process in which the mineral particles are impregnated with water, then frozen, and then dried. The freeze dried particles are then mixed into molten polymeric material and subjected to a high sheer mixing operation so as to peel individual platelets from multi-platelet particles and thereby reduce the particle sizes to the desired range.

The reinforcing substrate 22 may be prepared by combining the platelet mineral with the desired polymer in desired ratios. The components may be blended by general techniques known to those skilled in the art. For example, the components can be blended and then melted in mixers or extruders.

Additional specific preferred methods, for the purposes of the present invention, for forming a polymer composite having dispersed therein exfoliated layered particles are disclosed in U.S. Pat. Nos. 5,717,000, 5,747,560, 5,698,624, and WO 93/11190, each of which is hereby incorporated by reference. For additional background the following are also incorporated by reference: U.S. Pat. Nos. 4,739,007 and 5,652,284.

The exfoliation of layered mineral particles into the reinforcing substrate 22 need not be complete in order to achieve the objects of the present invention. This invention contemplates that at least 40% (by number) of the particles should be less than about 50 nanometers, or less than about 50 platelets stacked upon one another in the thickness direction. More preferably, at least 50% (by number) of the particles should have a thickness of less than 10 nanometers. Even more preferably, at least 70% (by number) of the particles should have a thickness of less than 5 nanometers. It is most preferable to have as many particles as possible to be as small as possible, ideally including only a single platelet.

As noted above, the preferred aspect ratio (which is the largest dimension divided by the thickness) for the particles is about 50 to about 300. At least 80% (by number) of the particles should be within this range. If too many particles have an aspect ratio of above about 300, the material becomes too viscous for forming parts in an effective and efficient manner. If too many particles have an aspect ratio of smaller than about 50, the particle reinforcements will not provide the desired reinforcement characteristics. More preferably, at least 80% (by number) of the particles have an aspect ratio from 100 to 200. Most preferably, at least 90% (by number) of the particles have an aspect ratio within the 100–200 range.

Generally, in accordance with the present invention, the reinforcing substrate 22 should contain less than 15% by volume of the reinforcement nanoparticles, with the balance comprising one or more appropriate polyolefins and suitable additives. More preferably, the concentration of nanoparticles in the reinforcing substrate is less than 12% by volume, still more preferably 2–10% by volume, and still more preferably 3–7% by volume. The particular concentration may vary depending on the base polymer and application.

Among the beneficial results obtained by using the nanoparticles in the reinforcing substrate 22 are that: the modulus of the reinforcing substrate can be increased (on the order of between about 200,000 to about 500,000 PSI, preferably between about 300,000 to about 450,000 PSI); the surface toughness is improved to reduce handling damage and part scrap and eliminate the need for extra packaging and protective materials; and the thermal, mechanical, and dimensional properties of the substrate are improved, so that the overall thickness and weight of the reinforcing substrate 22 are reduced.

Where the doors separate from each other during deployment of the air bag, the doors can be attached to the substrate with hinge components or tether devices to ensure that the doors do not become projectiles during actuation of the air bag assembly. Suitable connecting means and arrangements for practice in the present invention are disclosed in U.S. Pat. Nos. 5,456,490, 5,222,760, 5,569,959, and 5,560,646, the complete disclosure of each of which is incorporated herein by reference, although it is understood that the present invention is not limited to any of such connecting devices and/or arrangements. Where the doors are integrally molded, the doors can be reinforced at the hinged or tethered areas.

Although the method of the present invention has been embodied above in connection with the preparation of a instrument panel, it is understood that the method is equally applicable to other panel-like structures, including for example door panels, interior rear quarter panels, pillar covers and headliners.

The complete disclosures of any United States or foreign patents or patent applications or provisional applications mentioned or cited hereinabove are hereby incorporated by reference into the present specification.

The foregoing detailed description of the preferred embodiments of the invention has been provided for the purposes of illustration and description. It is not intended to be exhaustive or to limit the invention to the precise embodiments disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A process for making a panel structure mountable in an automobile vehicle to form a part of the interior thereof and adapted to conceal a secondary restraint system, the panel structure comprising a layered composite structure and a reinforcing substrate including at least one movable door, the reinforcing substrate being hidden from the vehicle interior when the panel structure is mounted in the automobile vehicle, the layered composite structure comprising an outer layer defining at least a portion of an at least partially exposed exterior surface of the panel structure and an inner layer, said process comprising:

applying a first composition comprising at least one base polymer and at least one coloring agent onto a first mold surface having a complementary configuration to the outer layer;

heating and substantially drying the first composition while on the first mold surface to form the outer layer;

disposing a seam-defining structure in spaced relation with the inner surface of the outer layer;

rotational casting a casting composition comprising at least one base polymer onto an inner surface of the outer layer while on the first mold surface and gelling and fusing the casting composition to form the inner layer with a structurally weakened portion having a reduced thickness adjacent the outer layer, the structurally weakened portion being formed in a space interposed between the seam-defining structure and the inner surface of the outer layer, the outer and inner layer together defining the layered composite structure with the outer layer masking the structurally weakened portion from view when the panel structure is mounted in the automobile vehicle; and uniting the layered composite structure with the reinforcing substrate so that the reinforcing substrate reinforces the outer layer, the structurally weakened portion of the inner layer being constructed and arranged to permit cooperative association with the movable door such that when the panel structure is mounted in the automobile vehicle, actuation of the secondary restraint system displaces the door into a passengers' compartment of the vehicle and fractures the layered composite structure along at least a portion of the structurally weakened portion to create a passageway which permits an air bag of the secondary restraint system to deploy into the passengers' compartment of the vehicle.

2. A process according to claim 1, further comprising depositing and gelling a filler material into the structurally weakened portion of the inner layer and simultaneously fusing the filler material and the casting composition, wherein the fused filler material has a lower tensile strength than the fused casting composition.

3. A process according to claim 1, wherein the structurally weakened portion has an H-shape.

4. A process according to claim 1, wherein the outer layer has a thickness in a range of from about 0.0025 cm to about 0.0038 cm.

5. A process according to claim 1, wherein the structurally weakened portion does not extend into the outer layer.

6. A process according to claim 5, wherein the outer layer has a thickness in a range of from about 0.0025 cm to about 0.0038 cm.

7. A process for making a panel structure mountable in an automobile vehicle to form a part of the interior thereof and adapted to conceal a secondary restraint system, the panel structure comprising a layered composite structure and a reinforcing substrate including at least one movable door, the reinforcing substrate being hidden from the vehicle interior when the panel structure is mounted in the automobile vehicle, the layered composite structure comprising an outer layer defining at least a portion of an at least partially-exposed exterior surface of the panel structure and an inner layer, said process comprising the steps of:

applying a water-dispersed composition onto a first mold surface having a complementary configuration to the outer layer, the water-dispersed composition comprising at least one light-stable aliphatic thermoplastic polyurethane containing at least one pendent functional group selected from the group consisting of hydroxyl and carboxyl functional groups, at least one coloring agent, and at least heat-activated crosslinker;

applying sufficient heat to induce partial crosslinking of the light-stable aliphatic thermoplastic polyurethane via the crosslinker;

substantially drying the water-dispersed composition while on the first mold surface so as to form the outer layer;

rotational casting a casting composition comprising at least one base polymer onto an inner surface of the outer layer while on the first mold surface and gelling and fusing the casting composition to form the inner layer with a structurally weakened portion having a reduced thickness adjacent to the outer layer, the inner layer being crosslinked with the polyurethane of the outer layer via residual unreacted functional groups of the crosslinker to thereby form the layered composite structure having interfacial chemical bonding between the inner surface of the outer layer and an adjacent surface of the inner layer, the outer layer masking the structurally weakened portion from view when the panel structure is mounted in the automobile vehicle; and uniting the layered composite structure with the reinforcing substrate so that the reinforcing substrate reinforces the outer layer, the structurally weakened portion of the inner layer being constructed and arranged to permit cooperative association with the movable door such that when the panel structure is mounted in the automobile vehicle, actuation of the secondary restraint system displaces the door into a passengers' compartment of the vehicle and fractures the layered composite structure along at least a portion of the structurally weakened portion to create a passageway which permits an air bag of the secondary restraint system to deploy into the passengers' compartment of the vehicle.

8. A process according to claim 7, wherein the crosslinker is carbodiimide.

9. A process according to claim 7, further comprising disposing a seam-defining structure in spaced relation with the inner surface of the outer layer during said rotational casting step and forming the structurally weakened portion in a space interposed between the seam-defining structure and the inner surface of the outer layer.

10. A process according to claim 9, further comprising depositing and gelling a filler material into the structurally weakened portion of the inner layer and simultaneously fusing the filler material and the casting composition, wherein the fused filler material has a lower tensile strength than the fused casting composition.

11. A process according to claim 7, further comprising contacting a seam-defining structure with a portion of the inner surface of the outer layer during said rotational casting step and forming the structurally weakened portion at the contacting portion of the inner surface of the outer layer.

12. A process according to claim 11, further comprising depositing and gelling a filler material into the structurally weakened portion of the inner layer and simultaneously fusing the filler material and the casting composition, wherein the fused filler material has a lower tensile strength than the fused casting composition.

13. A process according to claim 7, wherein the structurally weakened portion has an H-shape.

14. A process according to claim 7, further comprising the steps of:
    transferring the layered composite structure from the first mold surface to a second mold surface; and
    providing the reinforcing substrate on a third mold surface having a complementary configuration to the interior surface of the panel structure,
    wherein said uniting step comprises applying a reactive mixture to the layered composite structure while on the second mold surface, arranging the second and third mold surfaces so that the layered composite structure and the reinforcing substrate collectively define a mold cavity for accommodating the reactive mixture, and foaming the reactive mixture to form a polyurethane cellular foam that adheres the reinforcing substrate to the layered composite structure, and
    wherein the outer layer is provided with a compressing feel by the polyurethane foam and the inner layer.

15. A process according to claim 7, further comprising the steps of:
    transferring the layered composite structure from the first mold surface to a transparent surface of a holding platform;
    detecting and reinforcing rupturable portions of the layered composite structure;
    transferring the layered composite structure from the holding platform to a second mold surface; and
    providing the reinforcing substrate on a third mold surface having a complementary configuration to the interior surface of the panel structure,
    wherein said uniting step comprises applying a reactive mixture to the layered composite structure while on the second mold surface, arranging the second and third mold surfaces so that the layered composite structure and the reinforcing substrate collectively define a mold cavity for accommodating the reactive mixture, and foaming the reactive mixture to form a polyurethane cellular foam that adheres the reinforcing substrate to the layered composite structure, and
    wherein the outer layer is provided with a compressing feel by the polyurethane foam and the inner layer.

16. A process according to claim 7, wherein said drying step is performed by evaporating the water from the water-dispersed composition.

17. A process according to claim 7, further comprising the step of precoating the first mold surface with a microcrystalline wax mold releasing agent.

18. A process according to claim 7, wherein the light-stable aliphatic thermoplastic polyurethane and the heat-activated reactive crosslinker can be premixed and stably stored prior to said applying step for at least up to 24 hours at room temperature.

19. A process according to claim 7, wherein the first mold surface is heated during said applying step.

20. A process according to claim 7, wherein the casting composition includes poly(vinyl chloride) as a base polymer.

21. A process according to claim 7, wherein the casting composition includes a thermoplastic polyurethane as a base polymer.

22. A process according to claim 7, wherein the water-dispersed composition has a water concentration of from about 10 wt % to about 80 wt % prior to said heating step.

23. A process according to claim 22, wherein the water-dispersed composition has a solvent concentration of from about 9 wt % to about 15 wt % prior to said heating step.

24. A process according to claim 23, wherein the solvent is N-methyl pyrrolidone.

25. A process according to claim 24, wherein the water-dispersed composition further comprises at least one member selected from the group consisting of glycol ether acetate and xylene.

26. A process for making a panel structure mountable in an automobile vehicle to form a part of the interior thereof and adapted to conceal a secondary restraint system, the panel structure comprising a layered composite structure and a reinforcing substrate including at least one movable door, the reinforcing substrate being hidden from the vehicle interior when the panel structure is mounted in the automobile vehicle, the layered composite structure comprising an outer layer defining at least a portion of an at least partially-exposed exterior surface of the panel structure and an inner layer, said process comprising the steps of:
    precoating a microcrystalline wax mold releasing agent on a first mold surface, the first mold surface being heated to a first elevated temperature to melt and disperse the microcrystalline wax mold releasing agent;
    applying a water-dispersed composition onto a first mold surface having a complementary configuration to the outer layer, the water-dispersed composition comprising at least one light-stable aliphatic thermoplastic polyurethane containing at least one pendent functional group selected from the group consisting of hydroxyl and carboxyl functional groups, at least one coloring agent, and at least heat-activated crosslinker;
    applying sufficient heat to induce partial crosslinking of the light-stable aliphatic thermoplastic polyurethane via the crosslinker at a second elevated temperature;
    substantially drying the water-dispersed composition at a third elevated temperature while on the first mold surface so as to form the outer layer;
    rotational casting a casting composition comprising at least one base polymer onto an inner surface of the outer layer while on the first mold surface and gelling and fusing the casting composition to form the inner layer with a structurally weakened portion having a reduced thickness adjacent to the outer layer, the inner layer being crosslinked with the polyurethane of the outer layer via residual unreacted functional groups of the crosslinker to thereby form the layered composite structure having interfacial chemical bonding between the inner surface of the outer layer and an adjacent surface of the inner layer, the outer layer masking the structurally weakened portion from view when the panel structure is mounted in the automobile vehicle; and uniting the layered composite structure with the reinforcing substrate so that the reinforcing substrate reinforces the outer layer, the structurally weakened portion of the inner layer being constructed and arranged to permit cooperative association with the movable door such that when the panel structure is mounted in the automobile vehicle, actuation of the secondary restraint system displaces the door into a passengers' compartment of the vehicle and fractures the layered composite structure along at least a portion of the structurally weakened portion to create a passageway which permits an air bag of the secondary restraint system to deploy into the passengers' compartment of the vehicle.

27. A process according to claim 26, wherein the heat-activated reactive crosslinker is carbodiimide.

28. A process according to claim 26, wherein the first elevated temperature, second elevated temperature, and third elevated temperature are all the same and in a range of from about 140° F. to about 160° F.

29. A process according to claim 26, further comprising disposing a seam-defining structure in spaced relation with the inner surface of the outer layer during said rotational casting step and forming the structurally weakened portion in a space interposed between the seam-defining structure and the inner surface of the outer layer.

30. A process according to claim 29, further comprising depositing and gelling a filler material into the structurally weakened portion of the inner layer and simultaneously fusing the filler material and the casting composition, wherein the fused filler material has a lower tensile strength than the fused casting composition.

31. A process according to claim 26, further comprising contacting a seam-defining structure with a portion of the inner surface of the outer layer during said rotational casting step and forming the structurally weakened portion at the contacting portion of the inner surface of the outer layer.

32. A process according to claim 31, further comprising depositing and gelling a filler material into the structurally weakened portion of the inner layer and simultaneously fusing the filler material and the casting composition, wherein the fused filler material has a lower tensile strength than the fused casting composition.

33. A process according to claim 26, wherein the water-dispersed composition has a water concentration of from about 10 wt % to about 80 wt % prior to said heating step.

34. A process according to claim 33, wherein the water-dispersed composition has a solvent concentration of from about 9 wt % to about 15 wt % prior to said heating step.

35. A process according to claim 34, wherein the solvent is N-methyl pyrrolidone.

36. A process according to claim 35, wherein the water-dispersed composition further comprises at least one member selected from the group consisting of glycol ether acetate and xylene.

* * * * *